United States Patent [19]
Yonezawa

[11] Patent Number: 5,588,642
[45] Date of Patent: Dec. 31, 1996

[54] CLAMPING APPARATUS

[75] Inventor: Keitaro Yonezawa, Kobe, Japan

[73] Assignee: Kabushiki Kaisha Kosmek, Japan

[21] Appl. No.: 648,291

[22] Filed: May 15, 1996

Related U.S. Application Data

[63] Continuation of Ser. No. 331,101, Oct. 28, 1994, abandoned.

[30] Foreign Application Priority Data

Nov. 5, 1993 [JP] Japan .................................. 5-275844

[51] Int. Cl.[6] ...................................................... B25B 1/00
[52] U.S. Cl. ......................... 209/244; 269/49; 269/94; 269/137
[58] Field of Search ........................ 269/244, 243, 269/49, 285, 91–94, 246, 247, 137; 254/DIG. 2, 10.5, 98

[56] References Cited

U.S. PATENT DOCUMENTS

| | | | |
|---|---|---|---|
| 4,043,547 | 8/1977 | Glomb et al. | 269/244 |
| 4,098,500 | 7/1978 | Lenz | 269/244 |
| 4,102,372 | 7/1978 | Cremona | 269/244 |
| 4,219,918 | 9/1980 | Klann | 254/40.5 |
| 4,489,927 | 5/1984 | Yamada et al. . | |
| 4,504,046 | 3/1985 | Yonezawa et al. . | |
| 4,506,871 | 3/1985 | Yonezawa . | |
| 4,582,306 | 4/1986 | Sassenberg | 269/244 |
| 4,653,727 | 3/1987 | Chang et al. | 254/DIG. 2 |
| 4,830,349 | 5/1989 | Miyata . | |
| 4,909,493 | 3/1990 | Yonezawa . | |
| 4,932,640 | 6/1990 | Shirakawa . | |
| 4,948,105 | 8/1990 | Yonezawa . | |
| 4,968,011 | 11/1990 | Womack | 269/244 |
| 5,022,636 | 6/1991 | Swann | 269/244 |
| 5,108,079 | 4/1992 | Yonezawa et al. . | |
| 5,147,091 | 9/1992 | Yonezawa et al. . | |
| 5,160,124 | 11/1992 | Yamada et al. . | |
| 5,163,662 | 11/1992 | Bernstein | 269/244 |
| 5,174,554 | 12/1992 | Yonezawa . | |
| 5,181,700 | 1/1993 | Yonezawa . | |
| 5,181,701 | 1/1993 | Yonezawa . | |

FOREIGN PATENT DOCUMENTS

| | | |
|---|---|---|
| 49-36057 | 10/1974 | Japan . |
| 5-277585 | 10/1993 | Japan . |

*Primary Examiner*—Robert C. Watson
*Attorney, Agent, or Firm*—Bacon & Thomas

[57] ABSTRACT

A first threaded member (11) is supported by a housing (3) so as to be rotatable about its axis and to be unable to axially advance and retreat. While a second threaded member (22) is threadably engaged with the first threaded member (11) so as to be able to axially advance and retreat, the second threaded member (22) is supported by the housing (3) under the condition that its rotation about its axis is preventable. Under a clamping condition, the second threaded member (22) is strongly tightened by the first threaded member (11) which has been rotated by an impact wrench (16). Thereby, a metal mold (6) is fixedly pressed by a clamping member (5). When changing over from the clamping condition to an unclamping condition, large counterclockwise impacts are intermittently imposed to the first threaded member (11) by the wrench (16). Thereupon, the first threaded member (11) is rotated counterclockwise little by little by those impacts.

20 Claims, 7 Drawing Sheets

CLAMPING APPARATUS

This application is a Continuation of application Ser. No. 08/331,101, filed Oct. 28, 1994 now abandoned.

BACKGROUND OF THE INVENTION

1. Field of the Invention

The present invention relates to a clamping apparatus, and more specifically to a clamping apparatus of the type adapted to rotate one of two threaded members threadably engaged to each other so as to axially advance and retreat the other threaded member for driving a clamping member connected to the other threaded member.

2. Description of Prior Art

As such apparatus there has been known the one, for example as disclosed in the Japanese Utility Model Publication No. 49-36057.

In this apparatus, a bolt is threadably engaged with both a connecting internal thread formed in an object to be clamped and an advancing/retreating internal thread formed in a support base so as to be able to advance and retreat, and the bolt is directly rotated by an electric motor fixed to the support base.

There are, however, following problems associated with the above-mentioned conventional apparatus.

Although the object to be clamped and the support base are connected by the bolt, a screw clearance exists between the connecting internal thread of the object to be clamped and an external thread of the bolt as well as a screw clearance exists also between the advancing/retreating internal thread of the support base and the external thread of the bolt. Therefore, a force pulling the object to be clamped and the support base to each other is hardly produced between them.

SUMMARY OF THE INVENTION

It is an object of the present invention to provide a clamping apparatus which is capable of exerting a large clamping force.

Figure 1A:
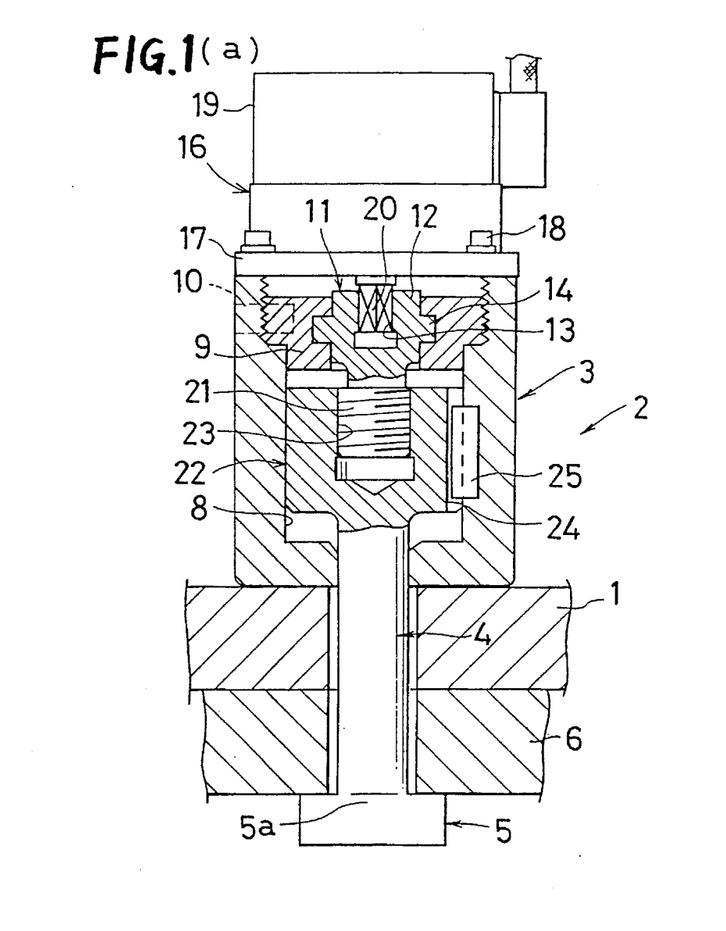
Figure 1B:
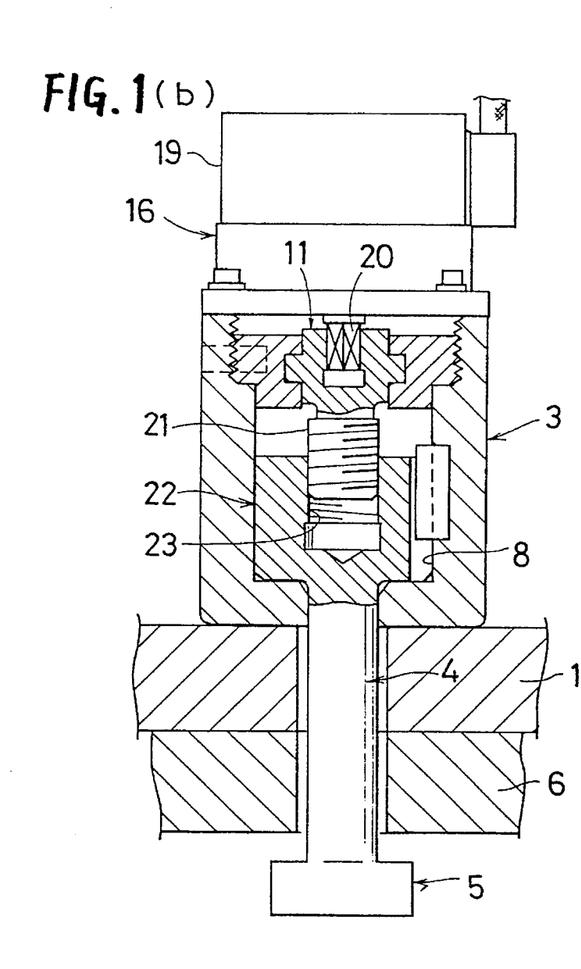

For accomplishing the above-mentioned object, for example as shown in FIG. 1, the present invention has constituted a clamping apparatus as follows.

A first threaded member 11 is supported by a housing 3 so as to be rotatable about its axis under the condition that its axial advancing and retreating movements are preventable. A second threaded member 22 is threadably engaged with the first threaded member 11 so as to be able to axially advance and retreat, and the second threaded member 22 is supported by the housing 3 under the condition that its rotation about its axis is preventable. An impact wrench 16 is mounted to the housing 3 to rotate the first threaded member 11 about the axis, and the second threaded member 22 is connected to an input portion 5a of a clamping member 5.

The present invention functions as follows due to the above-mentioned constitution.

Generally, in a tightening mechanism of the screw type, a comparatively small dynamical friction force acts between engaged thread surfaces at the end of tightening. But, at the beginning of loosening, a large statical friction force acts therebetween. Therefore, it is necessary to set a loosening torque to such a large value as to come up to 1.3 times through 2 times as large as a tightening torque.

Now, the present invention operates as follows, for example as shown in FIG. 1.

Under the clamping condition as illustrated in FIG. 1(a), the second threaded member 22 is strongly tightened by the first threaded member 11 of which vertical movement is prevented by an end plate 9 of the housing 3, and while a metal mold 6 is pushed upwards by a screw engagement force between both these threaded members 11, 22 through the clamping member 5, a reaction force against that pushing force is received by the housing 3 through the first threaded member 11. Under the above clamping condition, since a large statical friction force acts between the thread surfaces of both the threaded members 11, 22, the clamping condition is not cancelled even when the rotation of the impact wrench 16 is stopped.

When changing over from the clamping condition as illustrated in FIG. 1(a) to an unclamping condition as illustrated in FIG. 1(b), a large counterclockwise impact force is intermittently imposed to the first threaded member 11 by an output shaft 20 of the impact wrench 16. Thereupon, the first threaded member 11 is rotated counterclockwise little by little by that impact force against the above statical friction force. Thereby, the second threaded member 22 is lowered a little, so that the pushed condition by the clamping member 5 can be cancelled. As a result, since a load acting on the wrench 16 becomes lighter, the output shaft 20 can rotate at a high speed. Thereby, as shown in FIG. 1(b), the second threaded member 22 is lowered quickly, so that the clamping member 5 can be separated quickly from the lower surface of the metal mold 6.

When changing over from the unclamping condition as illustrated in FIG. 1(b) to the clamping condition as illustrated in FIG. 1(a), the output shaft 20 of the impact wrench 16 is made to rotate clockwise. Thereupon, the first threaded member 11 is quickly rotated clockwise, so that the second threaded member 22 can be raised quickly. Thereby, as shown in FIG. 1(a), the clamping member 5 is brought into contact with the lower surface of the metal mold 6. Thereupon, since the load acting on the output shaft 20 becomes larger, the second threaded member 22 is tightened impactively by the first threaded member 11. Thereby, the second threaded member 22 is raised a little, so that the metal mold 6 is strongly pushed by the clamping member 5.

Since the present invention is constituted and functions as mentioned above, the following effects can be obtained.

Since the first threaded member is supported by the housing under the condition that its axial movement is preventable, when the second threaded member is tightened by the first threaded member, it becomes possible to remove an axial clearance from between threads of both the threaded members. Therefore, a clamping force of the clamping apparatus becomes larger.

Under that clamping condition, since the large statical friction force acts on the threads of both the above threaded members, that large friction force can prevent the the clamping condition from being cancelled. Therefore, the clamping drive force may be removed under the clamping condition.

Further, since the first threaded member is adapted to be rotated by the impact wrench, the following effect can be obtained.

As noted above, in the general tightening mechanism of the screw type, it is necessary to make the loosening torque larger than the tightening torque. Therefore, even if the first threaded member is driven directly by a driving source such as an electric motor, it becomes necessary to set a capacity of the driving source to a large value in accordance with a value of the necessary loosening torque and it is also required to provide a means for changing over the tightening torque to a smaller torque than the loosening torque. Accordingly, the clamping apparatus becomes larger in size and also complicated in constitution.

Now, according to the present invention, it becomes possible to loosen the first threaded member by the impact force of the impact wrench against the statical friction force while rotating little by little. Therefore, the first threaded member can be readily and securely loosened. Incidentally, according to an experimental example employing the impact wrench of the air motor driving type, it can be understood that the first threaded member tightened by the impact wrench to which air pressure of 5 kgf/cm$^2$ is supplied is loosened by a supply of an air pressure of 3.5 kgf/cm$^2$ lower than that air pressure. Thereupon, 1 kgf/cm$^2$ as the pressure unit is about 0.098 MPa (Mega Pascal).

In that way, according to the present invention, since it is unnecessary to make the loosening torque larger than the tightening torque, the capacity of the driving source of the impact wrench becomes smaller as well as the torque changing over means is not required. Accordingly, the clamping apparatus can be manufactured smaller in size and simple in constitution.

BRIEF DESCRIPTION OF THE DRAWINGS

FIGS. 1–2 show a first embodiment of the present invention;

FIGS. 1(a) and 1(b) are vertical sectional views of a clamping apparatus, FIG. 1(a) shows a clamping condition thereof, and FIG. 1(b) shows an unclamping condition thereof;

FIGS. 2(a) and 2(b) are schematic views of an impact wrench arranged in the clamping apparatus, FIG. 2(a) is a vertical sectional view thereof and FIG. 2(b) is a partial view viewed from a right side thereof;

FIGS. 4(a) and 4(b) show a clamping apparatus of a third embodiment of the present invention, FIG. 4(a) is a vertical sectional view thereof and FIG. 4(b) is a plan view thereof;

FIGS. 7(a) and 7(b) are vertical sectional views of a clamping apparatus of a sixth embodiment of the present invention, FIG. 7(a) is a clamping condition thereof and FIG. 7(b) is a swung condition thereof;

FIGS. 8(a) and 8(b) and 8(c) show a clamping apparatus of a seventh embodiment of the present invention, FIG. 8(a) is a vertical sectional view thereof in the clamping condition and FIG. 8(b) is a vertical sectional view thereof in the swung condition and FIG. 8(c) is a left side view thereof in FIG. 8(a)

DESCRIPTION OF THE PREFERRED EMBODIMENTS

<First Embodiment>

Figure 2:
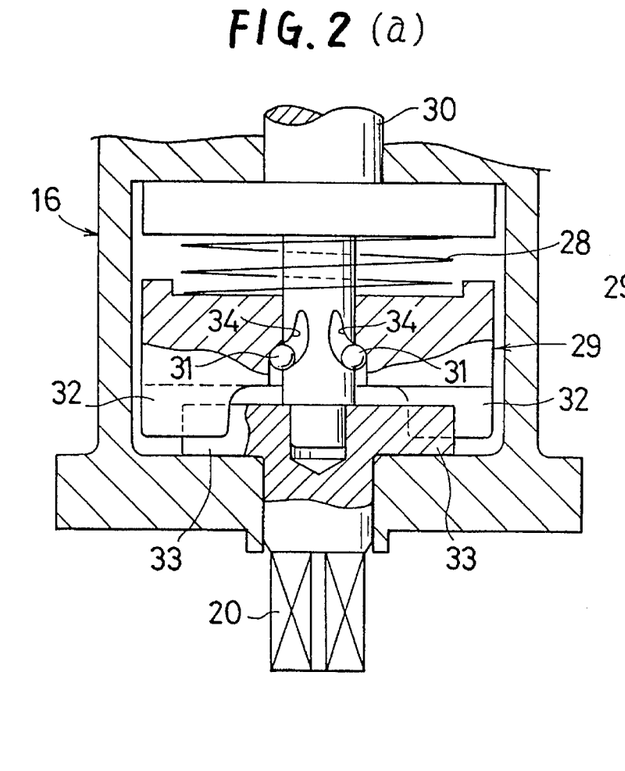

FIGS. 1 and 2 show a first embodiment of the present invention. Firstly, with reference to FIG. 1, a whole constitution of a clamping apparatus will be explained hereinafter. FIG. 1(a) is a vertical sectional view of a clamping condition of the clamping apparatus, and FIG. 1(b) is a vertical sectional view of an unclamping condition thereof.

As shown in FIG. 1(a), a housing 3 of the clamping apparatus 2 is fixedly secured onto an upper surface of a support base 1 by a plurality of bolts (not illustrated). A clamping rod 4 is projected downwards from the housing 3, and a metal mold 6 is clamped to a lower surface of the support base 1 by a clamping member 5 fixedly secured to the lower end portion of the clamping rod 4.

A guide bore 8 is formed in the housing 3 so as to extend vertically, and an end plate 9 is threadably secured to an upper portion of the guide bore 8. The symbol 10 designates a turning stopper pin. A driven portion 12 of the first threaded member 11 is supported by the end plate 9 so as to be rotatable about its axis and to be unable to advance and retreat in its axial direction. The driven portion 12 comprises an input square hole 13 and a flange 14 for preventing its advancement and retreat.

A flange 17 for mounting an impact wrench 16 of the electric type is fixedly secured to an upper end of the housing 3 by a plurality of bolts 18. The impact wrench 16 serves to impactively tighten the first threaded member 11 and to impactively loosen it by the rotation of an electric motor 19. Thereupon, an output shaft 20 of the impact wrench 16 is fitted into the square hole 13 of the first threaded member 11.

An internal thread portion 23 of a second threaded member 22 is threadably engaged with an external thread portion 21 of the first threaded member 11 so as to be able to advance and retreat in the axial direction. Further, the second threaded member 22 is supported by the housing 3 so as to be unable to rotate about its axis. That is, a guide groove 24 extending vertically is formed in the second threaded member 22, and a key 25 is inserted into the guide groove 24. The clamping rod 4 is projected downwards from a lower portion of the second threaded member 22. The lower portion of the clamping rod 4 is fixedly secured to an input portion 5a of the clamping member 5.

Next, an outline of the impact wrench 16 will be explained with reference to a schematic view of FIG. 2 hereinafter. FIG. 2(a) is a vertical sectional view, and FIG. 2(b) is a partial view viewed from its right side in FIG. 2(a).

While a load acting on the output shaft 20 is small, a weight 29 is kept in a lowered state by a pushing spring 28. Thereby, a rotary shaft 30 of the electric motor 19 (herein not illustrated) is coupled to receiving lugs 33, 33 of the output shaft 20 through engaging balls 31, 31 and impacting lugs 32, 32 of the weight 29 in order, so that the output shaft 20 can be rotated at a high speed.

When the output shaft 20 falls into such a condition that its rotation is locked by an enlargement of the load acting on the output shaft 20, the weight 29 and the balls 31, 31 go up along the guide grooves 34, 34. Thereby, an engagement between the receiving lugs 33, 33 and the impacting lugs 32, 32 is cancelled, so that the weight 29 can be rotated at a high speed along the upper surfaces of the receiving lugs 33, 33. Then, when the impacting lugs 32, 32 come to concaved portions between both the receiving lugs 33, 33, the weight 29 is lowered by the spring 28 so that the impacting lugs 32, 32 collide against the receiving lugs 33, 33. While the load acting on the output shaft 20 is large, the above operations are repeated.

Incidentally, it is preferable to interpose a speed change gear in a midway portion of the rotary shaft 30 of the electric motor.

As shown in FIG. 1, the clamping apparatus 2 operates as follows.

When changing over from the clamping condition as illustrated in FIG. 1(a) to the unclamping condition as illustrated in FIG. 1(b), the output shaft 20 of the impact wrench 16 is made to rotate counterclockwise in the plan view. Thereupon, the first threaded member 11 is impactively rotated counterclockwise, so that the second threaded member 22 is lowered a little and the clamped fixed condition by the clamping member 5 is cancelled. Thus, since the load acting on the output shaft 20 becomes lighter, the output shaft 20 is rotated at a high speed. Thereby, as shown in FIG. 1(b), the second threaded member 22 is lowered quickly, so that the clamping member 5 is separated quickly from the lower surface of the metal mold 6.

When changing over from the unclamping condition as illustrated in FIG. 1(b) to the clamping condition as illustrated in FIG. 1(a), the output shaft 20 of the impact wrench 16 is made to rotate clockwise. Thereupon, the first threaded member 11 is rotated clockwise quickly, so that the second threaded member 22 is raised quickly. Thereby, as shown in FIG. 1(a), the clamping member 5 is brought into contact with the lower surface of the metal mold 6. Thereupon, since the load of the output shaft 20 becomes larger, the second threaded member 22 is tightened impactively by the first threaded member 11. Thereby, the second threaded member 22 is raised a little, so that the metal mold 6 is pushed strongly by the clamping member 5.

According to this embodiment, the following advantages can be obtained.

Since the axial movement of the first threaded member 11 is received by the end plate 9 through the advancement preventive flange 14, a large clamping force can be secured by removing the screw clearance between the two threaded members 11, 22. Even when a clamping drive force is vanished under the clamping condition, the cancellation of the clamping condition can be prevented by the large statical friction force acting between both the threads of the external thread portion 21 of the first threaded member 11 and the internal thread portion 23 of the second threaded member 22. Further, since the impact wrench 16 can be rotated quickly under the non-loaded condition, the clamping member 5 can be operated quickly. Therefore, the clamping operation time is short.

On the other hand, according to the clamping apparatus 2 of the electromotive screw type of the present invention, the following advantages can be obtained in comparison with a hydraulic clamping apparatus which has been conventionally wide used.

Since the hydraulic clamping apparatus needs an oil hydraulic pump as a power source and an electromagnetic changeover valve for supplying and discharging a pressurized oil, further an electric wiring for a pump driving electric motor, a pressurized oil supply piping and discharge piping and an electric wiring for the electromagnetic changeover valve are required and also a constitution of of a control device for electrically controlling those appliances becomes complicated. To the contrary, since the clamping apparatus 2 of the electromotive screw type of the present invention needs only an electric wiring to the electric motor 19 as well as the constitution of the control device can be simple, its manufacturing cost and its installation cost are remarkably reduced.

Further, in the hydraulic clamping apparatus, since an electric energy is converted to a rotational energy of the electric motor and then converted to a pressure energy of the oil hydraulic pump, a conversion loss is large. To the contrary, in the clamping apparatus 2 of the electromotive screw type, since the clamping drive can be performed directly by the electric motor 19, an energy loss is small.

Further, in the hydraulic clamping apparatus, since an oil leakage and an oil mist generation can not be prevented perfectly, it is difficult to keep an environment of its installation site clean. To the contrary, in the clamping apparatus 2 of the electromotive screw type, since the oil leakage and the oil mist generation are scarcely caused, it is easy to keep the environment clean.

FIGS. 3 through 9 show a second embodiment through an eighth embodiment of the present invention respectively. In these embodiments, explanations thereof will be carried out, in principle, by designating the same component members as those in the first embodiment by the same symbols.

<Second Embodiment>

Figure 3:
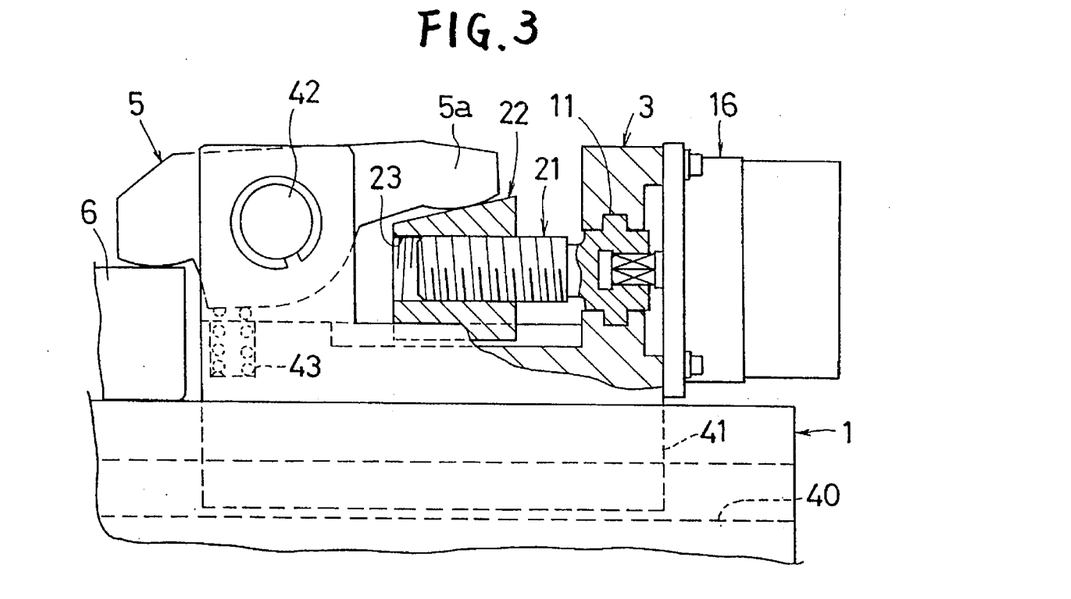
FIG. 3 is a vertical sectional view of a clamping apparatus of a second embodiment of the present invention.

FIG. 3 shows a vertical sectional view of a clamping apparatus of the second embodiment.

A T-shaped leg 41 formed in the lower end portion of the housing 3 is fitted into a T-shaped groove 40 formed in the support base 1 so as to be slidable in the left and right direction. A pivot pin 42 is disposed at the left upper portion of the housing 3, and the arm-like clamping member 5 is swingably supported by the pivot pin 42. The first threaded member 11 is horizontally supported by the right upper portion of the housing 3. When the first threaded member 11 is rotated by the impact wrench 16, the second threaded member 22 is moved in the left direction, so that the upper right portion of the second threaded member 22 pushes the input portion 5a of the clamping member 5 upwardly. By the way, the symbol 43 designates an unclamping return spring.

<Third Embodiment>

Figure 4A:
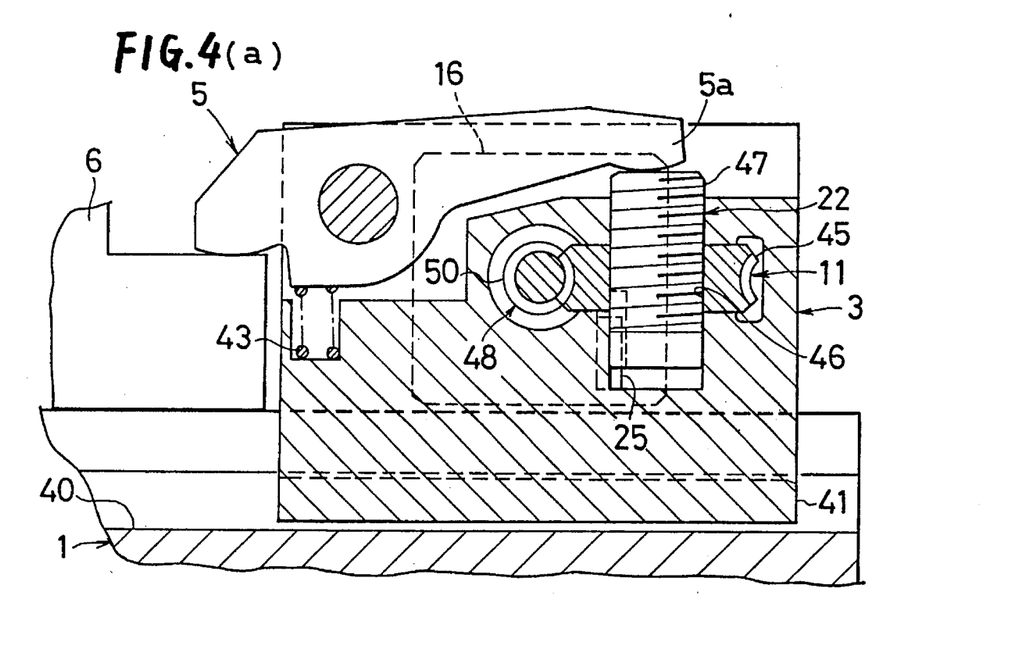
Figure 4B:
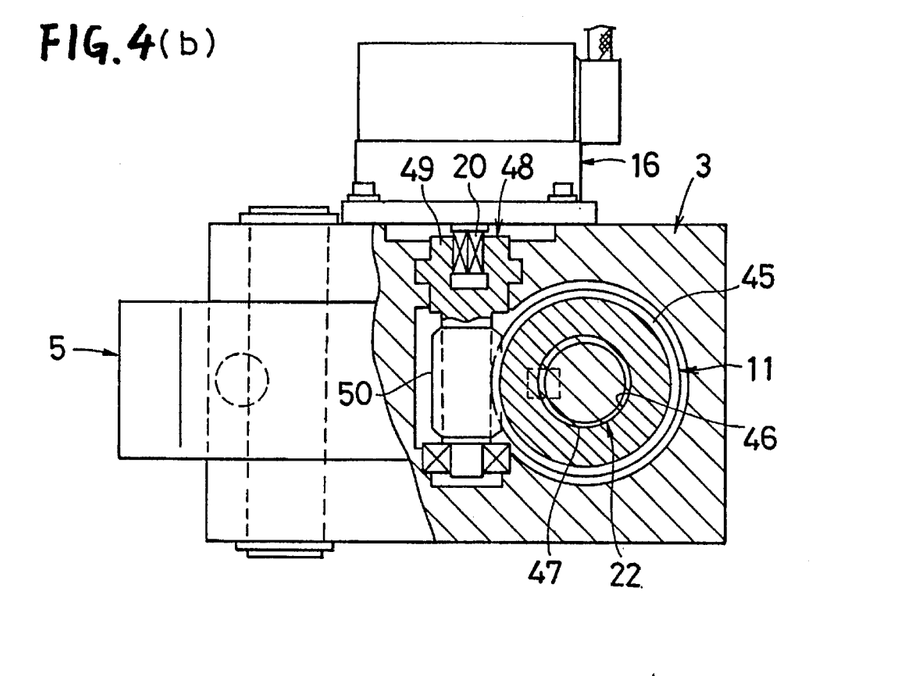

FIG. 4 shows a clamping apparatus of the third embodiment, which is obtained by modifying the above embodiment illustrated in FIG. 3 as follows. FIG. 4(a) is a vertical sectional view, and FIG. 4(b) is a plan view.

The first threaded member 11 is provided with an external gear 45 and an internal thread portion 46 and supported by the housing 3 so as to be rotatable about its axis and to be vertically immovable. An external thread portion 47 of the second threaded member 22 is threadably engaged with the internal thread portion 46 so as to be able to advance and retreat vertically. Further, a transmission member 48 is rotatably supported by the housing 3. An input portion 49 of the transmission member 48 is coupled to the output shaft 20 of the impact wrench 16, and a worm gear 50 of the transmission member 48 is meshed with the external gear 45 of the first threaded member 11.

<Fourth Embodiment>

Figure 5:
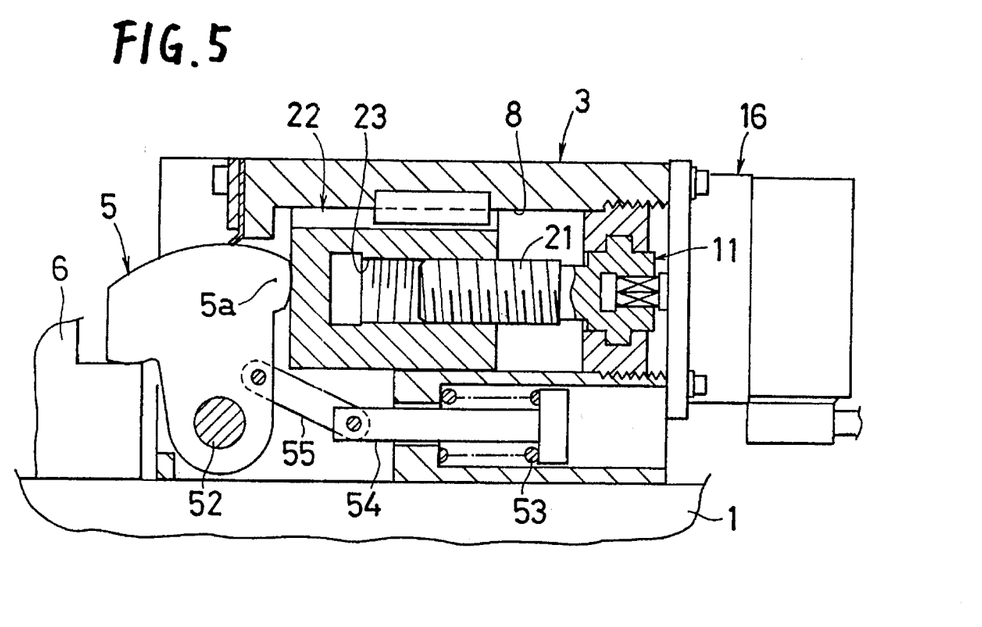
FIG. 5 is a vertical sectional view of a fourth embodiment of the present invention.

FIG. 5 is a vertical sectional view of a clamping apparatus of the fourth embodiment.

The first threaded member 11 and the second threaded member 22 are disposed horizontally within the upper portion of the housing 3, the clamping member 5 is swingably supported by a pivot pin 52 disposed in the left lower portion of the housing 3, and the left portion of the second threaded member 22 is adapted to be brought into contact with the input portion 5a of the clamping member 5. The clamping member 5 is adapted to be driven for unclamping by a resilient force of a return spring 53 through a rod 54 and a link 55.

<Fifth Embodiment>

Figure 6:
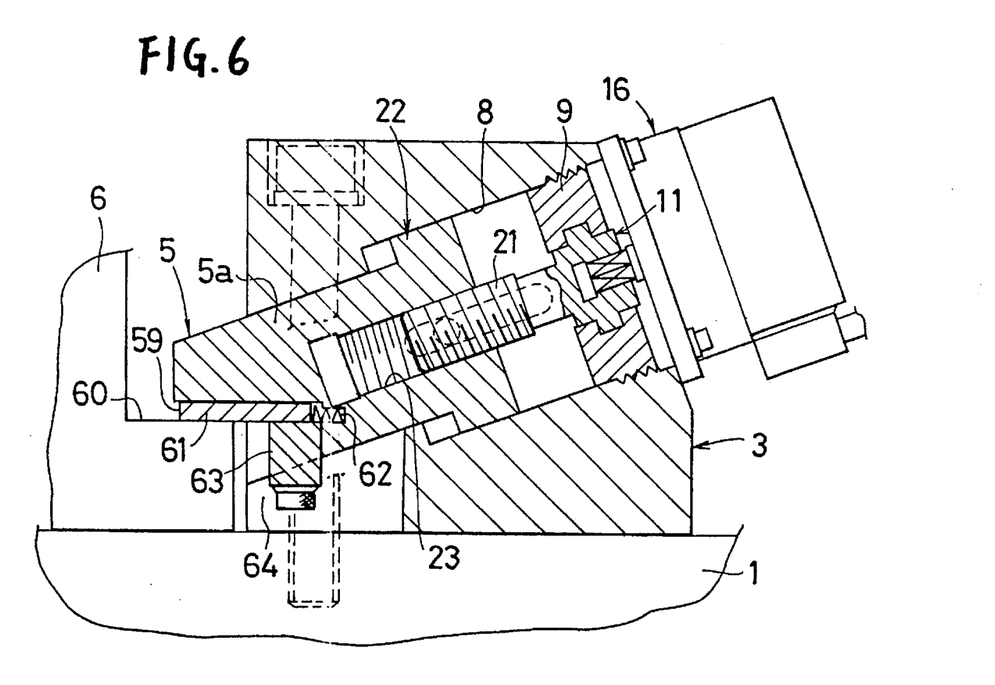
FIG. 6 is a vertical sectional view of a clamping apparatus of a fifth embodiment of the present invention.

FIG. 6 is a vertical sectional view of a clamping apparatus of the fifth embodiment.

The guide bore 8 is formed in the housing 3 leftwards declivitously, the first threaded member 11 is supported by the end plate 9 fixedly secured to the right portion of the guide bore 8, and the second threaded member 22 is inserted into the guide bore 8. The clamping member 5 is projected integrally from the left upper portion of the second threaded member 22. A clamping end surface 59 of the clamping member 5 is made substantially parallel to a clamped end surface 60 of the metal mold 6.

A sliding shuttle member 61 is supported by the clamped end surface 59 so as to be slidable within a certain range in the left and right direction, and a spring 62 is disposed so as to resiliently urge the shuttle member 61 leftwards. A guide member 63 tightened to the lower portion of the clamping member 5 by a bolt is guided by guide walls 64 of the housing 3 so as to move linearly. Thereby, the second threaded member 22 is prevented from rotating about its axis.

<Sixth Embodiment>

Figure 7A:
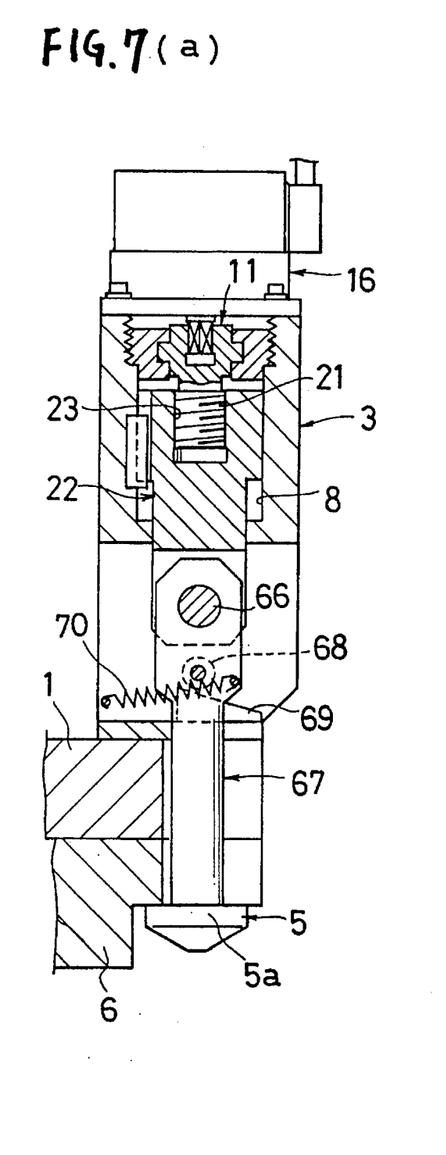
Figure 7B:
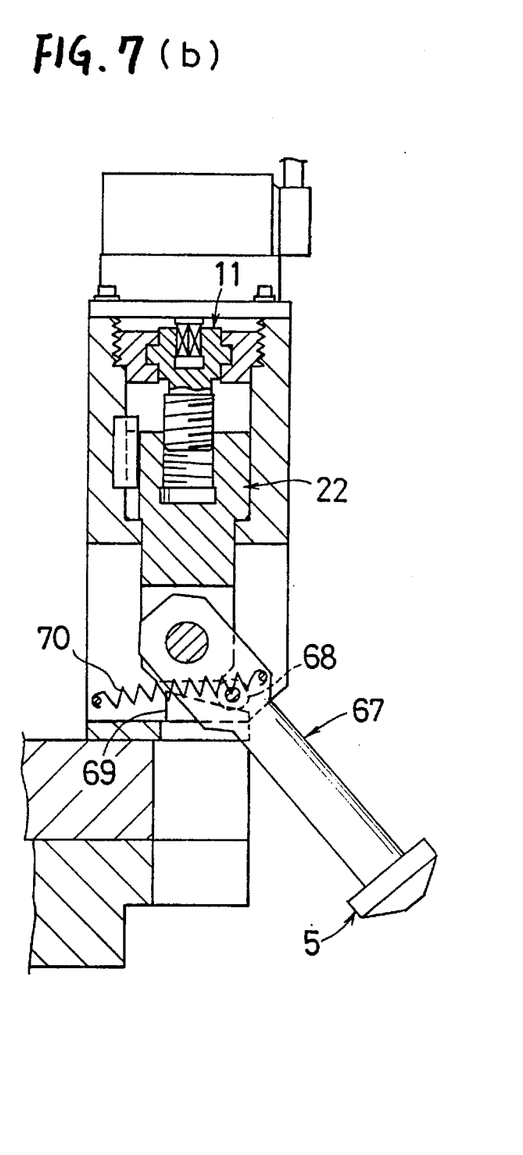

FIG. 7 is a vertical sectional view of a clamping apparatus of the sixth embodiment.

Under the clamping condition as illustrated in FIG. 7(a), when the second threaded member 22 is tightened by the first threaded member 11, the metal mold 6 is pushed to the support base 1 by the clamping member 5 through a clamping rod 67 supported by the lower portion of the second threaded member 22 through a pin 66.

When changing over from the above clamping condition to a swingable condition as illustrated in FIG. 7(b), the second threaded member 22 is advanced downwards by the first threaded member 11. Thereupon, firstly the clamping member 5 is made to separate from the lower surface of the metal mold 6 by the lowering of the clamping rod 67 and then when a guide roller 68 is brought into contact with an inclined cam 69, the clamping rod 67 is made to swing against a swing returning spring 70.

<Seventh Embodiment>

Figure 8A:
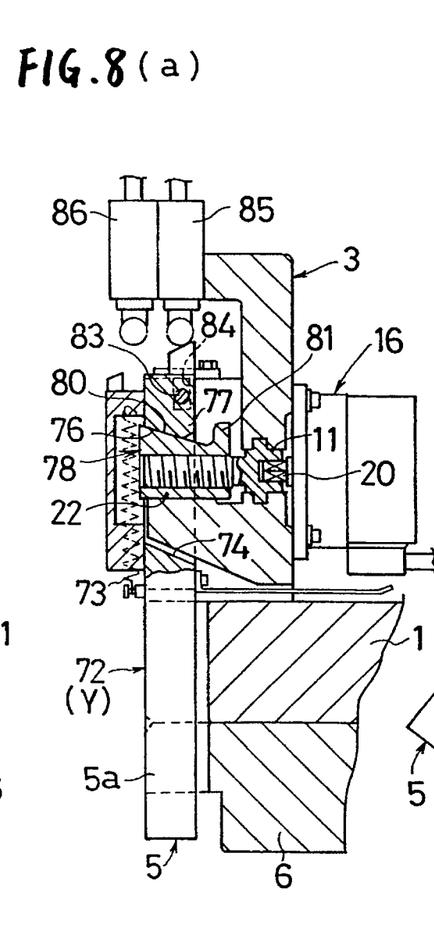
Figure 8B:
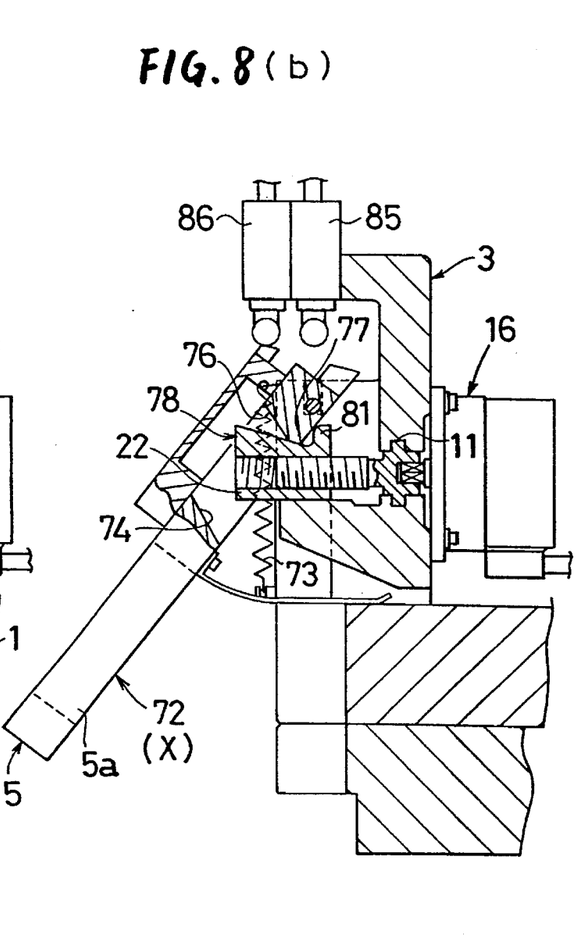
Figure 8C:
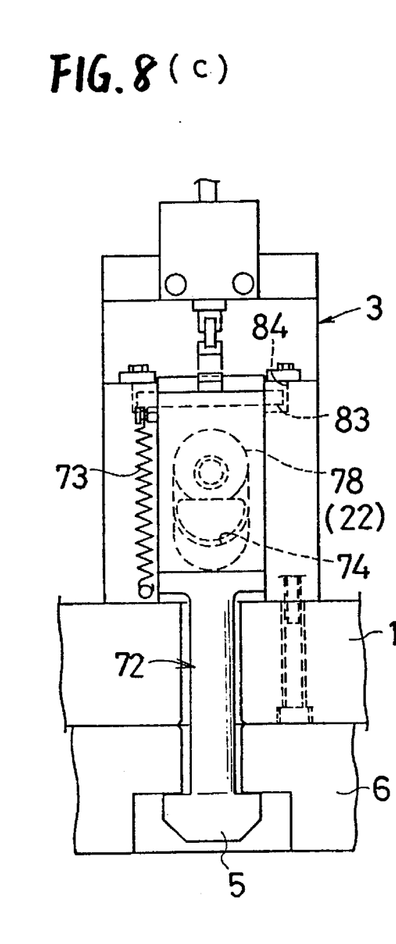

FIG. 8 shows a clamping apparatus of the seventh embodiment, FIG. 8(a) is a vertical sectional view under the clamping condition, FIG. 8(b) is a vertical sectional view under the swung condition and FIG. 8(c) is a left side view in FIG. 8(a).

An upper portion of a clamping rod 72 is supported by the housing 3 so as to be movable vertically and swingable in the left and right direction (the left and right direction is defined in FIGS. 8(a) and 8(b)). That is, a pivot pin 83 is projected from opposite sides of the clamping rod 72, and the pivot pin 83 is inserted into guide grooves 84 of the housing 3 so as to be vertically movable. The clamping member 5 is disposed at the lower end portion of the clamping rod 72. Between the housing 3 and the pivot pin 83 there are provided a spring (not illustrated) for urging the rod 72 downwards and a swing returning spring 73 for swinging the rod 72 inwardly in the left and right direction. A through hole 74 is formed in a midway portion of the rod 72 in the vertical direction.

A clamping pressure receiving surface 76 and a swinging operated portion 77 are arranged left and right in the upper surface of the through hole 74 respectively, and a wedge member 78 is supported by the housing 3 so as to be movable in the left and right direction. The wedge member 78 is provided with a pushing surface 80 adapted to wedgewise engage with the pressure receiving surface 76 to push the clamping rod 72 upwards and an opening portion 81 adapted to engage with the operated portion 77 to swing the clamping rod 72 outwardly in the left and right direction.

The second threaded member 22 is formed integrally in the wedge member 78, the first threaded member 11 adapted to reciprocate the second threaded member 22 in the left and right direction is rotatably supported by the housing 3, and the output shaft 20 of the impact wrench 16 is connected to the first threaded member 11.

Incidentally, the symbol 85 designates a limit switch for detecting the clamping condition, and the symbol 86 does a limit switch for detecting the swung condition.

The above clamping apparatus operates as follows.

Under the swung condition as illustrated in FIG. 8(b), the wedge member 78 has been driven to the leftward unclamping side by the impact wrench 16. Thereby, the operated portion 77 of the clamping rod 72 has been pushed leftwards by the operating portion 81 of the wedge member 78 against the swing returning spring 73, and the clamping rod 72 has been pushed downwards by the return spring (not illustrated), so that the clamping rod 72 has been changed over to the swung position X.

When changing over from the swung condition to the clamping condition, the wedge member 78 is driven to the rightward clamping side b the impact wrench 16. Thereupon, firstly the clamping rod 72 is swung toward the right lower side by the swing returning spring 73 and subsequently, as shown in FIG. 8(a), the pushing surface 80 of the wedge member 78 is made to wedgewise engage with the pressure receiving surface 76 of the clamping rod 72, so that the pressure receiving surface 76 is driven upwards by the pushing surface 80. Thereby, the clamping rod 72 is changed over to the clamping position Y, so that the metal mold 6 is clamped to the lower surface of the support base 1 by the clamping member 5.

According to the seventh embodiment, the following advantages can be obtained.

In the clamping apparatus of the swing type, since the wedge member 78 adapted to engage with the clamping rod 72 is reciprocated in the left and right direction, a height of the clamping apparatus can be made lower by arranging the impact wrench 16 in a lateral space of the clamping rod 72 as well as the clamping apparatus can be manufactured in a simple constitution.

Since the clamping rod 72 can be held in the clamping condition by a wedge engagement force between the pushing surface 80 of the wedge member 78 and the pressure receiving surface 76 of the clamping rod 72, it becomes possible to more securely prevent a shifting of the metal mold 6 and a dropping thereof.

Since it is not necessary to swing the impact wrench 16, it becomes unnecessary to make a pressure hose, an electric wire and the likes flexible and a piping cost becomes inexpensive. Further, since the swinging operated portion is arranged near to the pivot pin 83 of the clamping rod 72, it becomes possible to make the clamping rod 72 largely swing by a small stroke of the wedge member 78 and to decrease an energy consumption of the impact wrench 16.

9

<Eighth Embodiment>

Figure 9:
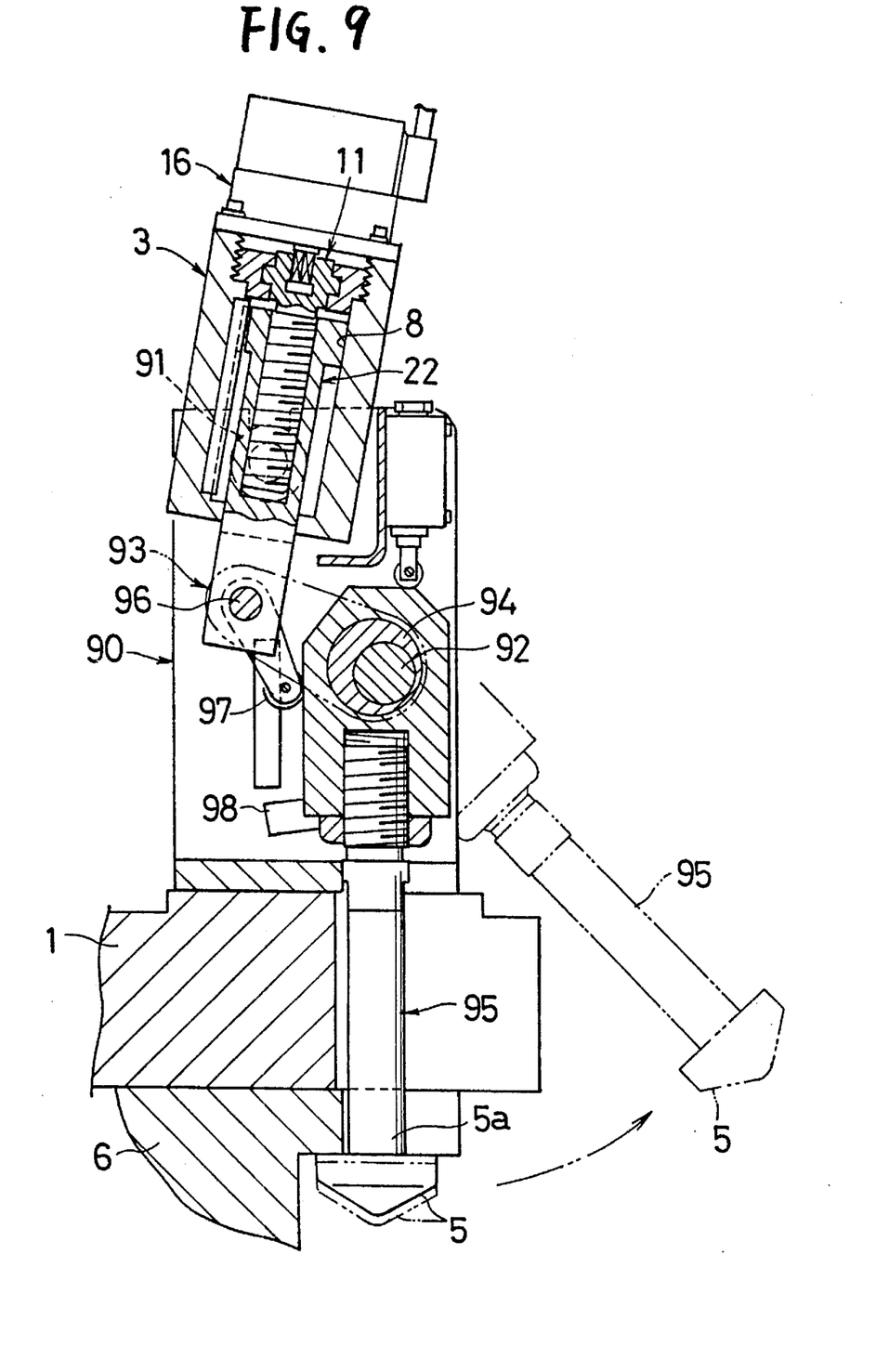
FIG. 9 shows a vertical sectional view of an eighth embodiment of the present invention.

FIG. 9 is a vertical sectional view of a clamping apparatus of the eighth embodiment.

A frame 90 is fixedly secured to the upper surface of the support base 1, and the housing 3 is swingably supported by an left upper portion of the frame 90 through a pivot pin 91. Another pivot pin 92 is supported by a midway height portion of the frame 90, and a boss portion 94 of an operation arm 93 is externally fitted to the another pivot pin 92 so as to be eccentrically rotatble. An upper portion of a clamping rod 95 is externally rotatably fitted to the boss portion 94, and the clamping member 5 is fixedly secured to a lower portion of the clamping rod 95. A left portion of the operation arm 93 is rotatably connected to a lower portion of the second threaded member 22 inserted into the housing 3 by a pin 96.

Under the clamping condition depicted by the solid line, since the second threaded member 22 is raised by the impact wrench 16 so that the left end portion of the operation arm is swung upwards, the upper portion of the clamping rod is pushed upwards by the boss portion 94 so that the metal mold 6 is clamped to the lower surface of the support base 1 by the clamping member 5.

When changing over from the clamping condition to the swung condition indicated by the view depicted with the alternate long and two short dashes line, the second threaded member 22 is lowered by the impact wrench 16. Thereupon, firstly since the left portion of the arm 93 is swung downwards, the upper portion of the clamping rod 95 is pushed downwards by the boss portion 94. Thereby, the clamping member 5 is separated from the metal mold 6. Subsequently, when a guide roller 97 connected to the pin 96 is brought into contact with a swing guide plate 98, the upper portion of the clamping rod 95 is pushed in the rightward and upper direction by the guide roller 97 to swing the rod 95.

Also in the above-mentioned second through eighth embodiments, it is of course that the same effects as those explained in the first embodiment can be obtained.

Incidentally, the above respective embodiments may be modified as follows.

The first threaded member 11 may be merely supported by the housing 3 under the condition that its axial adavancing and retreating movements is preventable or may be advanced and retreated axially within an allowable range. Further, the second threaded member 22 may be merely supported by the housing 3 under the condition that its rotation about the axis is preventable or may be rotated about the axis within an allowable range.

As the driving source of the impact wrench 16, an air motor and a hydraulic motor may be used instead of the electric motor. Further, an impact force generating mechanism of the impact wrench 16 may make use of hydraulic pulses instead of the impacts caused by the weight.

As the object to be clamped by the clamping apparatus, a work and other kinds of objects to be machined may be employed instead of the metal mold.

As many different embodiments of the present invention will be obvious to those skilled in the art, some of which have been disclosed or referred to herein, it is to be understood that the specific embodiments of the present invention as presented herein are intended to be by way of illustration only and are not limiting on the present invention, and it is to be understood that such embodiments changes, or modifications may be made without departing from the spirit and scope of the present invention as set forth in the claims appended hereto.

10

What is claimed is:

1. A clamping apparatus comprising:

a housing;

a first threaded member having a first, longitudinally extending axis;

means for supporting said first threaded member within said housing for rotation about said first axis while restricting longitudinal movement of said first threaded member relative to said housing;

a second threaded member having a second, longitudinally extending axis, an outer periphery and an associated longitudinal length, said second threaded member being threadably engaged with said first threaded member for movement through a longitudinal clamping stroke with the outer periphery and the entire said associated longitudinal length of said second threaded member being substantially entirely surrounded and guidably supported throughout said longitudinal clamping stroke by said housing for relative longitudinal movement;

means, interconnected between said second threaded member and said housing, for permitting said second threaded member to move longitudinally along said second axis while restricting rotational movement of said second threaded member about said second axis;

an impact wrench mounted to said housing and connected to said first threaded member for rotating said first threaded member about said first axis; and a clamping member movable between a clamping position and an unclamping position, said clamping member having an input portion connected to said second threaded member.

2. The clamping apparatus according to claim 1, wherein said first threaded member is provided with an external thread portion and said second threaded member is provided with an internal thread portion, said external thread portion being threadably engaged with said internal thread portion.

3. The clamping apparatus according to claim 1, wherein said impact wrench includes an output shaft which is coaxially arranged with respect to said first threaded member.

4. The clamping apparatus according to claim 2, wherein said clamping member includes a clamping rod interconnecting said second threaded member and said input portion, said clamping rod extending along said second axis, at least when said clamping member is in said clamping position.

5. The clamping apparatus according to claim 4, wherein said clamping rod is fixedly secured to said second threaded member.

6. The clamping apparatus according to claim 2, wherein said clamping member is integrally formed with said second threaded member.

7. The clamping apparatus according to claim 1, wherein said clamping member is adapted to be drawn towards said housing as said clamping member moves from said unclamping position to said clamping position in order to shift an object to be clamped towards said housing.

8. A clamping apparatus comprising:

a housing including an integrally formed peripheral guide portion;

a first threaded member having a first, longitudinally extending axis;

means for supporting said first threaded member within said housing for rotation about said first axis while restricting longitudinal movement of said first threaded member relative to said housing;

a second threaded member having a second, longitudinally extending axis and an outer peripheral surface, said second threaded member being located within said housing with the guide portion of said housing surrounding the outer peripheral surface of said second threaded member, said second threaded member also being threadably engaged with said first threaded member;

means, interconnected between said second threaded member and said housing, for permitting said second threaded member to move longitudinally along said second axis while restricting rotational movement of said second threaded member about said second axis;

an impact wrench mounted to said housing and connected to said first threaded member for rotating said first threaded member about said first axis; and a clamping member movable between a clamping position and an unclamping position, said clamping member having an input portion connected to said second threaded member.

9. The clamping apparatus according to claim 8, wherein said housing is formed with an internal guide bore that defines said peripheral guide portion, both said internal guide bore and said threaded member being circular in cross-section.

10. The clamping apparatus according to claim 8, wherein said clamping member is adapted to be drawn towards said housing as said clamping member moves from said unclamping position to said clamping position in order to shift an object to be clamped towards said housing.

11. The clamping apparatus according to claim 8, wherein said first threaded member is provided with an external thread portion and said second threaded member is provided with an internal thread portion, said external thread portion being threadably engaged with said internal thread portion.

12. The clamping apparatus according to claim 8, wherein said impact wrench includes an output shaft which is coaxially arranged with respect to said first threaded member.

13. The clamping apparatus according to claim 11, wherein said clamping member includes a clamping rod interconnecting said second threaded member and said input portion, said clamping rod extending along said second axis, at least when said clamping member is in said clamping position.

14. The clamping apparatus according to claim 13, wherein said clamping rod is fixedly secured to said second threaded member.

15. The clamping apparatus according to claim 11, wherein said clamping member is pivotally attached to said housing for movement between said clamping and unclamping positions.

16. The clamping apparatus according to claim 15, further comprising a spring member biasing said clamping member towards said clamping position.

17. The clamping apparatus according to claim 11, wherein said clamping member is integrally formed with said second threaded member.

18. The clamping apparatus according to claim 8, wherein said input portion is located along said second axis at least when said clamping member is in said clamping position.

19. The clamping apparatus according to claim 8, wherein said second axis is adapted to extend at an acute angle to an object to be clamped.

20. The clamping apparatus according to claim 1, wherein said input portion is located along said second axis at least when said clamping member is in said clamping position.

\* \* \* \* \*